United States Patent [19]
Braun et al.

[11] 3,944,061
[45] Mar. 16, 1976

[54] TROUGH CONVEYOR CONSTRUCTION, PARTICULARLY FOR SCRAPER CHAIN CONVEYORS

[75] Inventors: Ernst Braun; Gert Braun, both of Essen-Heisingen, Germany

[73] Assignee: Halbach and Braun, Germany

[22] Filed: Oct. 24, 1974

[21] Appl. No.: 517,778

[30] Foreign Application Priority Data
Nov. 6, 1973 Germany............................ 2355325

[52] U.S. Cl. ................ 198/204; 198/168; 403/112; 403/161
[51] Int. Cl.²......................................... B65G 15/60
[58] Field of Search ........... 198/168, 191, 204, 195, 198/205; 403/112, 161

[56] References Cited
UNITED STATES PATENTS
3,583,552  6/1971  Rehwick .......................... 198/168 X

*Primary Examiner*—Evon C. Blunk
*Assistant Examiner*—Douglas D. Watts
*Attorney, Agent, or Firm*—McGlew and Tuttle

[57] ABSTRACT

A conveyor trough construction, particularly for scraper chain conveyors, comprises a conveyor having longitudinal side walls formed with a plurality of abutting sections, each having a longitudinally extending bore therethrough which aligns with the next adjacent section. The bores of adjacent pairs of sections terminate in inwardly bevelled ends, and a coupling bolt extends through the bores of adjacent sections and terminates at each of its ends with an inwardly tapered portion which is engaged in the inwardly tapered ends of the bores. Each section is provided with a side wall opening, which extends into the bore, and a locking spring is inserted in the opening and engaged over the coupling bolt. The bore of the sections is dimensioned to provide an axial clearance for the locking spring.

11 Claims, 3 Drawing Figures

TROUGH CONVEYOR CONSTRUCTION, PARTICULARLY FOR SCRAPER CHAIN CONVEYORS

FIELD AND BACKGROUND OF THE INVENTION

This invention relates in general to the construction of conveyor troughs and, in particular, to a new and useful trough conveyor, particularly for scraper chain conveyors, which includes side walls made up of a plurality of individual interconnected sections which are held together by bolts extending through bores thereof which are locked in position by a locking spring which engages over a portion of the circumference of the coupling bolt in the bores.

DESCRIPTION OF THE PRIOR ART

At the present time, some conveyor troughs are made up of individual sections which are held together by screw bolt connections which permit a limited free motion between the trough sections. Such screw bolt connections have only limited capabilities for absorbing bending or tension and compression stresses, as well as shear stresses, which necessarily occur particularly during the advance of the conveyor trough, and due to the changes of clearances between parts during movement of the trough sections. During the advance, considerable forces act on the conveyor trough at relatively distant points so that frequently, adjacent trough sections are advanced through unequal distances and become angled in respect to each other. In consequence, the screw bolt connections between adjacent trough sections are often knocked or torn off or at least considerably deformed. This means that the damaged trough sections may be dismounted and replaced. This requires considerable energy, time and material, and leads to undesirable long stoppages. Also frequently it happens that, through carelessness, the screw bolt connections are not renewed or fixed, so that a faultless connection between the individual trough sections is not ensured.

Cast trough connections are known in which the connection elements are bolts and connection pockets or only trough bays which are associated therewith. These are substantially profile end pieces which must be fixed or welded to the end portions of the trough sections. With such constructions, the connection bolts have a too small resistance relative to the strong advance forces and tend to bend or tear off.

Trough connections which comprise substantially box-like bolt receptacles and connecting bolts receivable therein are also known. The box-like bolt receptacles are welded to the lateral walls of the trough sections and they form a constructional unit therewith. The connection bolts are secured in the box-like receptacles by means of cross-pins. In the known construction, the mounting or fixing of the trough sections is difficult because the connection bolts or their end portions and the associated box-like bolt receptacles form mating parts so that they form a rigid trough connection. Such a rigid trough connection is hardly appropriate for the rough service conditions in which the advance of a conveyor trough is subjected. Moreover, the trough connections welded to the side walls of the trough sections project from the outline of the conveyor and form disturbing obstacles.

Applicant has previously proposed the welding of connection bolts and connection claws to the adjacent lateral walls of the sections so that the connection claws and the associated lateral walls of the trough sections form connection pockets while the connection bolts and the connection claws are formed in the zone of their opposite remote sides with connection noses and seat recesses for a common connection member. This provides a trough connection in which the connecting elements are not only capable of absorbing the bending without difficulties and compression, tension and shear stresses which occur particularly during the advance of the conveyor trough, but also permits the necessary play between the trough sections and they are particularly simple in design. The construction has proved satisfactory, but it projects from the lateral outline of the trough and cannot be used with a coal planer without providing intermediate elements. Also, the connection bolts are not replaceable so that when they are bent or torn off, the respective trough sections must be replaced.

SUMMARY OF THE INVENTION

In accordance with the invention, there is provided, a trough which is capable of absorbing the occurring bending, compression, tension and shear stresses without difficulties, and of also supporting considerably higher stresses as compared with the known constructions and which includes a construction in which the parts do not project from the lateral wall outline. In accordance with the invention, the trough side walls are made up of individual sections which include longitudinally extending bores therethrough in which are positioned coupling bolts between adjacent pairs of sections. The construction provides a simple mounting and dismounting construction which is replaceable as a unit and ensures that the trough sections can be centrically aligned. The coupling bolts are designed as loose coupling bolts having conical centering heads at each end which engage in corresponding conical ends of the bores of adjacent pairs of sections. The ends of the bores are conically formed to accommodate the conical coupling bolts and the bolts are secured in the bores of the sections by means of spring locks which engage over the coupling bolts and leave an axial clearance for movement of the bolts in the bores. With the inventive arrangement, symmetrically designed connecting bolts bridge the junction areas of the trough sections to be connected to each other and the bevelled ends of each bolt bears against a similarly bevelled interior wall of the bore with the intermediate portion of the bolt being concentrically aligned within circular portions of the bores. The conical formations of each end of the bores and each end of the bolt ensures centering of the bolt within the bore and the construction permits the angling of the trough sections through a large angle in any desired direction. In addition, the conical centering heads, in cooperation with the conical centering surfaces, ensure an exact centering of the adjacent trough sections, particularly in their straightly aligned position. Also, the conical centering heads and the conical centering surfaces in the cavities or bores serve as a guide for the axially movable coupling bolts. Consequently, at any angling of the trough sections, the coupling bolt, although its conical centering heads disengage from the conical centering surfaces, continues to be guided in this area even at extreme angles so that the overall centering of the mutually connected trough sections is maintained.

The following features are also substantial for the invention. In accordance with the invention, in its middle portion or intermediate portion, located between the two adjacent trough sections, each coupling bolt comprises a cylindrical seat which has a radial clearance of a predetermined value between the bolt and the surrounding inner surface of the bore of the two trough sections. To some degree, therefore, a centering is obtained in the junction, to accommodate the two sections. However, the radial clearance of motion between the parts is dimensioned so as to ensure an angling possibility for the shoots through as large an angle as possible.

In order to ensure that disturbing obstacles do not project from the lateral walls of the trough sections, the circular cavities of the bores are located, in accordance with a preferred embodiment of the invention, within profile bays provided in the lateral walls of the sections. The coupling bolts can be secured in the circular cavities of the bores in a simple manner if, in accordance with the invention, the circular chambers are provided in the circular cavities for the spring locks and also slide-in openings are provided from the outside wall to the interior of the bore. This permits the introduction of the spring locks and the clear heighth of these openings is smaller than the diameter of the circular chambers so that the spring locks both embrace the coupling bolts and are clamped in the circular chamber by expansion and cannot become dislodged. The spring locks are advantageously designed so that they close the slide-in openings and thereby, the circular chambers. The invention also provides that the circular chambers comprise stop shoulders which limit the clear width of the slide-in openings in the longitudinal direction of the bolts. These shoulders are provided to stop the spring locks as soon as the locks are at least partly displaced behind the stop shoulders by the centering heads of the bolts during a tension loading of the bolts. Thus, at a tension load and due to the axial clearance of motion, the spring locks are displaced by the conical centering heads of the coupling bolts behind the stop shoulders so that even under extreme tension loads, the spring locks cannot be pushed out of the circular chambers. It is useful to provide stop cams in the circular chambers which secure the spring locks against rotation because the locks are designed as spring rings which have slip-on jaws for slipping the ring over the coupling bolt in the zone between the centering head and the intermediary cylindrical seat portion. Therefore, due to the locking against rotation, the jaws of the spring ring remain directed toward the inside of the circular chamber while the solid web on the backside of the spring ring closes the slide-in opening of the circular chamber. The outer diameter of the spring rings is slightly larger than the inner diameter of the circular chambers in order to provide a clamping of the rings in the chambers due to the ring expansion.

Finally, the invention provides a construction wherein the axial clearance to accommodate motion between the centering heads of the coupling bolts and the spring rings is determined by the width of the rings and is bilaterally symmetrical. Therefore, in case of an angling, the coupling bolts preferably occupy a position coinciding with the angle bisector. In order to ensure a sufficient freedom of motion of the coupling bolts in the zone of the spring locks or rings, the invention provides a radial clearance having a predetermined value between the spring rings and the coupling bolts.

The advantages obtained by the invention are to be seen substantially in the provision of a trough section in which the connection bolts are designed as loose and, therefore, are replaceable coupling bolts. Consequently, the inventive trough connection is capable of absorbing a multiple of the bending, compression, tension and shear stresses which occur during the advance of the conveyor trough while, at the same time, they permit a rapid mounting or dismounting. In any case, in a single connection, both coupling bolts absorb the shear stresses which occur while, in the known devices, only one of the connection bolts, at the one or the other side of the trough, has to support the occurring transverse stresses. It is further particularly advantageous that the coupling bolts are loosely positioned within the bores to ensure a more flexible linkage of the series connected trough sections and permit an angling of the sections through large angles. An additional advantage is the particular centering effect so that in their angled as well as in their straight mutual positions the trough sections are always perfectly aligned. The inventive trough connection is a relatively simple and, in particular, operationally effective construction which, in addition, can easily be additionally mounted on the trough sections which are already in service.

Accordingly, it is an object of the invention to provide an improved trough construction which is made up of a plurality of longitudinal sections with pairs having aligned bores which are conically bevelled at each end and which contain coupling bolts which extend therethrough and have conical end parts which engage and are centered in the conical bores, the bolts having a central cylindrical portion which is adapted to lie between the trough sections and each including a spring member which engages over a portion of the bolt within the bore by being introduced through an access opening formed in the sidewall of the trough.

A further object of the invention is to provide a conveyor trough construction which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
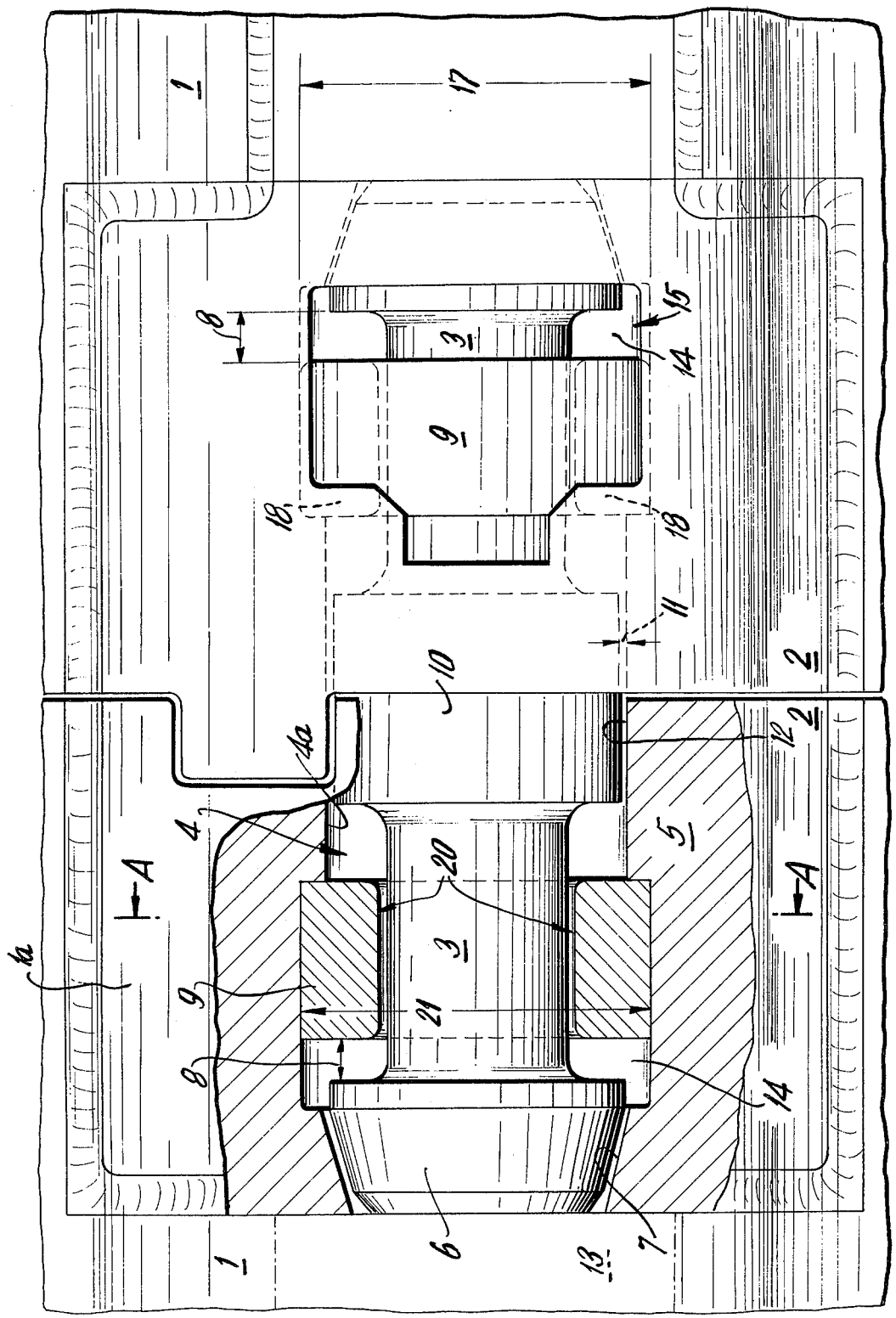
FIG. 1 is a side elevational view, partly in section, of a trough constructed in accordance with the invention.
Figure 2:
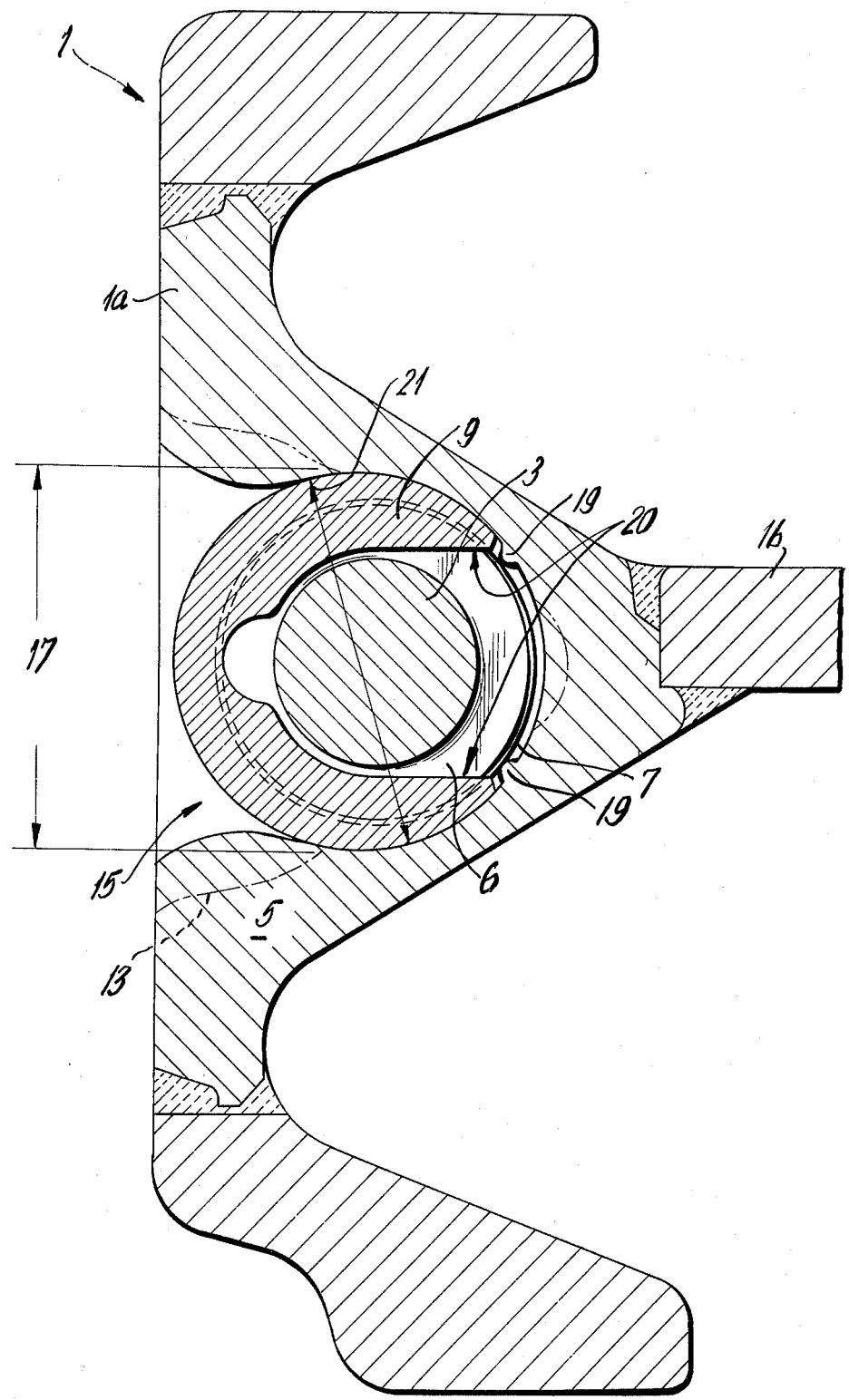
FIG. 2 is a vertical sectional view taken along the line A—A of FIG. 1.
Figure 3:
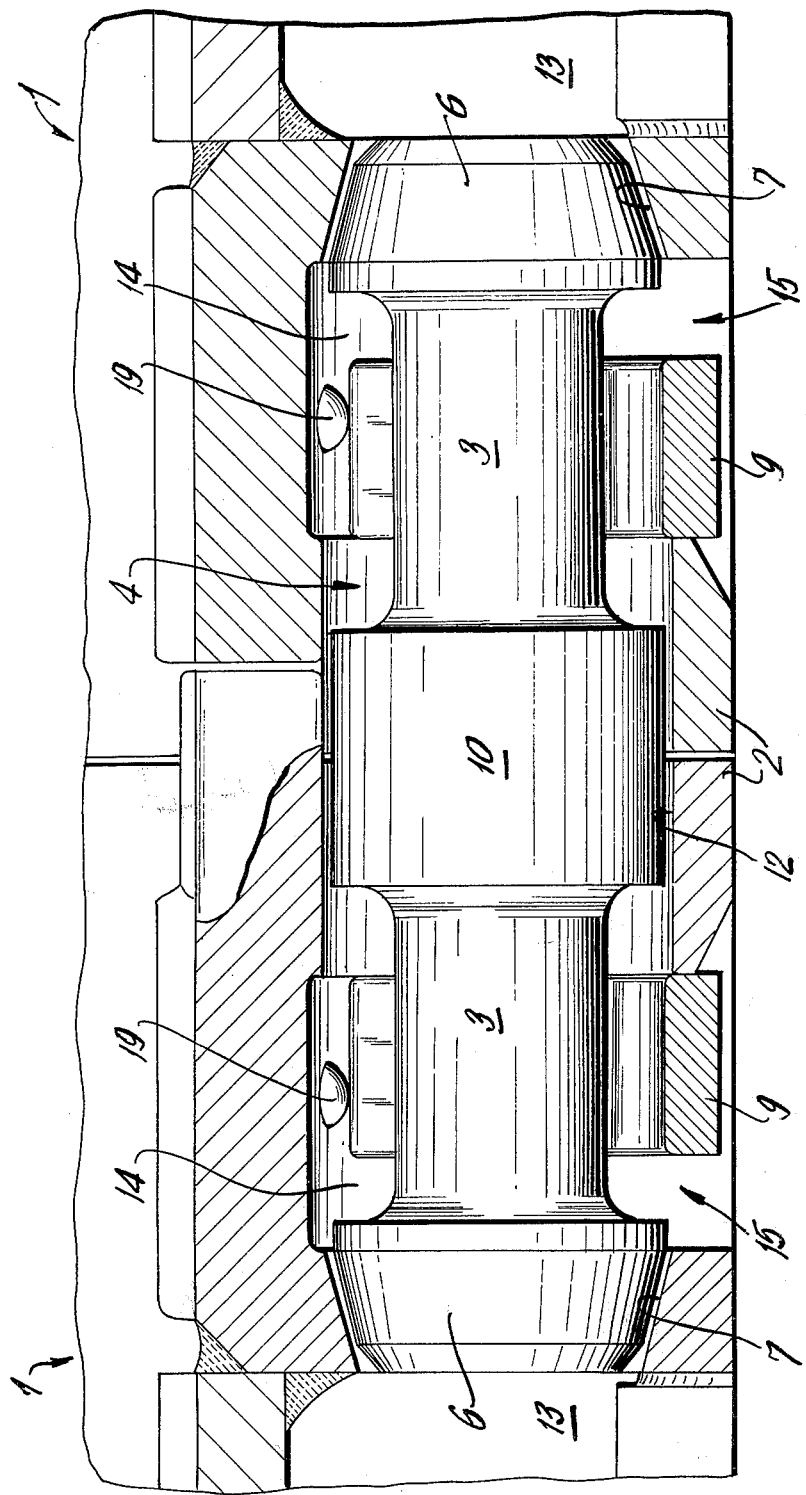
FIG. 3 is a view similar to FIG. 1, but showing the locking springs removed.

Referring to the drawings in particular, the invention embodied therein, comprises a scraper chain conveyor construction which includes a plurality of longitudinally extending sections or shoots, each of which includes sidewalls 1a connected to a bottom 1b.

In accordance with the invention, each sidewall 1a includes a longitudinally extending bore or cavity defined therethrough, in which is positioned a coupling bolt 3 which extends through a pair of adjacent sections 1. The bore or bolt receptacle 4 of sections 1 extend through sidewall widened central portions 5 and they are designed as loose bolts having conical centering heads 6 at each end. The bore 4 includes a circular cavity 4a at its abutting end and an opposite end cavity which is conically formed and provides conical centering surfaces 7 at each end which correspond to the conicity of the centering heads 6 of the bolts 3.

In accordance with a feature of the invention, the coupling bolts 3 are secured in their cavities or bores 4 by means of spring locks 9 which are of U-shaped configuration and engage over a portion of the diameter of the associated bolt and are arranged in an annular cavity portion 14 so that there is an axial clearance 8 permitting some axial motion of a predetermined value.

Each coupling bolt 3 comprises a cylindrical seat portion 10 which is intermediate its length and which is located so as to bridge the division between the individual trough sections 1. A relative radial clearance 11 for radial motion is defined between the inner circular surface 12 of the bore 4 and the central cylindrical portion 10 of the bolt 3.

The circular cavities or bores 4 are located within the profile bays 13 provided in the lateral walls 5 of the sections 1. The bore 4 includes a circular chamber 14 intended to receive the spring lock 9 which opens to a slide-in opening 15 for the spring lock which is provided in the outside wall portions of the circular chambers 14. The clear height of the opening 15 is smaller than the diameter 17 of the chambers 14. Spring locks 9 must be compressed in order to be introduced into chambers 14 and they are then permitted to expand in the chambers to clamp themselves into position. The chambers 14 include shoulders 18 which limit the clear width of the slide-in openings 15 in the longitudinal direction of the bolts and the spring locks are stopped by shoulders 18 when they are displaced by centering heads 6 under tension load acting on coupling bolts 3. Stop cams 19 are also provided in circular chambers 14 in order to secure spring locks 9 against rotation. Such a locking against rotation is recommended, particularly, if the spring locks 9 are designed as spring rings having slip-on jaws 20 for slipping the ring over coupling bolt 3 in the zone between the centering head and the central seat portion 10.

The outer diameter 21 of spring rings 9 is slightly larger than the inner diameter of the circular chamber 14 in order to obtain the clamping effect mentioned above. The axial clearance permitting motion between the centering heads 6 and the spring rings 9 is determined by the width of the rings, and it is bilaterally symmetrical. A radial clearance for motion between the parts having a predetermined value is provided between the spring rings 9 and coupling bolts 3 in order to ensure a sufficient freedom of motion for the coupling bolts 3 in the zone of spring locks 9 in cases where the trough sections 1 are angled in respect to each other. The central axes of the circular chambers 14 are offset toward the outside of the trough relative to the central axes of the coupling bolts 3. This effects a favorable displacement of the force absorbing surfaces for the center of mass loading.

While a specific embodiment of the invention has been shown and described in detail to illustrate the application of the principles of the invention, it will be understood that the invention may be embodied otherwise without departing from such principles.

What is claimed is:

1. A conveyor trough construction, particularly for scraper chain conveyors, comprising a conveyor having longitudinal sidewalls formed of a plurality of abutting sections each having a longitudinally extending bore therethrough defined by interior walls having conical portions at each end tapering toward the adjacent end, a bolt extending through the bores of adjacent section pairs and having a conical portion at each end tapering toward the adjacent end and complementary to the conical wall portions defining the bores, each section having a side wall opening which extends into said bore, and a locking spring inserted in the side wall portion and engaged over said coupling bolt, the interior walls of said bore being dimensioned in the vicinity of said locking spring to provide an axial clearance for said locking spring.

2. A conveyor trough construction, according to claim 1, wherein said coupling bolt includes a cylindrical intermediate portion which extends through the parting plane between adjacent sections, the interior walls defining the bore being cylindrical around the cylindrical portion of said coupling bolt and having a radial clearance of a predetermined value with said cylindrical portion of said coupling bolt.

3. A conveyor trough construction, according to claim 1, wherein said sidewall includes a widened intermediate portion tapering inwardly to the interior of said trough, said trough having a bottom connected to the inwardly tapered portion, said side wall opening extending into said trough sidewalls from the side thereof opposite to the inwardly tapered portion in the vicinity of said widened intermediate portion of said sidewalls.

4. A conveyor trough construction, according to claim 1, wherein said interior walls defining the bore has a cavity portion in the vicinity of said spring lock of cylindrical form which is smaller than the sidewall opening, said locking spring having an exterior diameter which is somewhat greater than the opening so that it must be compressed and engaged around said coupling bolt.

5. A conveyor trough construction, according to claim 4, including a stop shoulder defined on said interior walls defining said bore in the vicinity of said locking spring defining axial limit stops for said spring.

6. A conveyor trough construction, according to claim 4, including a pair of stop cams located on said interior wall defining said bore, said locking spring comprising a U-shape member having ends engageable with the respective locking cams and securing said cams against rotation.

7. A conveyor trough construction, according to claim 6, wherein said locking spring comprises a spring ring of U-shape configuration having leg portions defining slip-on jaws for slipping the ring over said coupling bolts.

8. A conveyor trough construction, according to claim 7, wherein said locking spring has an outer diameter slightly larger than the inner diameter of the interior walls defining the bore in the vicinity of the locking spring.

9. A conveyor trough construction, according to claim 8, including stop shoulder elements in said interior walls defining the bore located to permit a slight axial clearance of motion between said conical heads of said coupling bolts and said locking spring and which is determined by the width of said locking spring.

10. A conveyor trough construction, according to claim 7, wherein said locking spring has an interior diameter defining a radial clearance of motion between said locking spring and said coupling bolt.

11. A conveyor trough construction, according to claim 5, wherein the center of the bore defined by said interior walls offset toward the opening from the center of said coupling bolts.

* * * * *